US012640125B1

United States Patent

(12) United States Patent
Melhart

(10) Patent No.: US 12,640,125 B1
(45) **Date of Patent: *May 26, 2026**

(54) FOLDING MARIMBA HAVING REDUCED LENGTH

(71) Applicant: Jim Melhart Piano and Organ Company, McAllen, TX (US)

(72) Inventor: Jimmie Ray Melhart, McAllen, TX (US)

(73) Assignee: JIM MELHART PIANO AND ORGAN COMPANY, McAllen, TX (US)

( * ) Notice: Subject to any disclaimer, the term of this patent is extended or adjusted under 35 U.S.C. 154(b) by 179 days.

This patent is subject to a terminal disclaimer.

(21) Appl. No.: 18/419,052

(22) Filed: Jan. 22, 2024

Related U.S. Application Data

(63) Continuation of application No. 17/666,314, filed on Feb. 7, 2022, now Pat. No. 11,881,194, which is a continuation of application No. 17/154,435, filed on Jan. 21, 2021, now Pat. No. 11,244,662.

(60) Provisional application No. 62/965,658, filed on Jan. 24, 2020.

(51) Int. Cl.
*G10D 13/09* (2020.01)
*G10D 13/10* (2020.01)

(52) U.S. Cl.
CPC ............. *G10D 13/09* (2020.02); *G10D 13/10* (2020.02)

(58) Field of Classification Search
CPC ......... G10D 13/09; G10D 13/10; G10D 13/00
See application file for complete search history.

(56) References Cited

U.S. PATENT DOCUMENTS

| | | | | |
|---|---|---|---|---|
| 3,776,091 | A | 12/1973 | Suzuki | |
| 4,646,614 | A | 3/1987 | Suzuki | |
| 4,848,207 | A | 7/1989 | Kawai | |
| 5,463,925 | A | 11/1995 | Galocy | |
| 5,479,843 | A | 1/1996 | Yanagisawa | |
| 6,696,628 | B2 | 2/2004 | Yoshida | |
| D609,499 | S | 2/2010 | Irisa | |
| 9,029,674 | B2 | 5/2015 | Gold | |
| 9,406,287 | B2 | 8/2016 | Glowka | |
| 9,536,506 | B1 | 1/2017 | Melhart | |
| 10,109,263 | B1 | 10/2018 | Fugate | |
| 10,325,577 | B1 | 6/2019 | Melhart | |
| 10,643,590 | B2 | 5/2020 | Melhart | |
| 10,930,254 | B2 | 2/2021 | Melhart | |
| 11,881,194 | B1 * | 1/2024 | Melhart | G10D 13/08 |
| 2016/0148601 | A1 | 5/2016 | Glowka | |

(Continued)

*Primary Examiner* — Kimberly R Lockett
(74) *Attorney, Agent, or Firm* — Pizarro Allen PC

(57) ABSTRACT

A folding marimba may include a first set of spaced apart rails: a first set of tone bars suspended from the first set of spaced apart rails; a second set of spaced apart rails; a second set of tone bars suspended from the second set of spaced apart rails; a third set of spaced apart rails; a third set of tone bars suspended from the third set of spaced apart rails; a fourth set of spaced apart rails; and a fourth set of tone bars suspended from the fourth set of spaced apart rails. The first and second sets of spaced apart rails and the third and fourth sets of spaced apart rails are respectively configured for hinged rotation about a hinge line. The marimba is configurable in an unfolded configuration having a first length and a folded configuration having a second length that is less than the first length.

15 Claims, 5 Drawing Sheets

(56) References Cited

U.S. PATENT DOCUMENTS

| | | | |
|---|---|---|---|
| 2016/0148602 | A1 | 5/2016 | Glowka |
| 2019/0304416 | A1 | 10/2019 | Melhart |
| 2021/0217388 | A1 | 7/2021 | White |
| 2021/0233502 | A1 | 7/2021 | Melhart |

* cited by examiner

FOLDING MARIMBA HAVING REDUCED LENGTH

CROSS REFERENCE TO RELATED APPLICATIONS

This application is a continuation of U.S. patent application Ser. No. 17/666,314 filed Feb. 7, 2022, which is a continuation of U.S. patent application Ser. No. 17/154,435 filed Jan. 21, 2021, which claims priority to U.S. Provisional Patent Application No. 62/965,658 filed Jan. 24, 2020, the disclosure of each of which is incorporated herein by reference.

FIELD

This application relates generally to percussion musical instruments, and marimbas in particular.

COPYRIGHT NOTICE

This application contains material that is subject to copyright protection. Such material may be reproduced exactly as it appears in Patent and Trademark Office patent files or records. The copyright owner otherwise reserves all rights to such material.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A marimba is a percussion instrument including one or more sets of tone bars (e.g., wooden bars) disposed in a generally opposed, parallel relationship. The tone bars are struck with mallets to produce musical tones. In some instances, resonators suspended beneath the tone bars amplify their sound. The tone bars are arranged like keys on a piano, with groups of 2 or 3 accidental bars raised vertically, overlapping the natural bars to aid the performer both visually and physically. The marimba is a type of idiophone, as is the xylophone. While the present disclosure uses the example of a marimba, it generally relates to percussion musical instruments such as xylophones, metallophones, vibraphones, and glockenspiels.

Because these instruments may have considerable length and width, there is a need to be able to make the size more compact for the player to carry the instrument. This is particularly a need when the player is a younger, smaller student. Further, in order to advance in skill development, the player should be able to practice on a full-size instrument rather than a smaller instrument adapted for the smaller student. It would be a significant advancement in the art to provide a marimba that may be easily, quickly, and manually adjusted to reduce its size for transport and storage and to expand it to full size for playing.

SUMMARY

A folding marimba may include a plurality of rails, a plurality of natural bars suspended from some of the rails, and a plurality of accidental bars suspended from some of the rails. In some embodiments, the rails may be mounted to resonator panels. The rails and/or the resonator panels may be configured for hinged rotation such that the marimba is configurable in an unfolded position having a first length and a folded position having a second length that is less than the first length. For example, the second length may be about half of the first length.

In some embodiments, a marimba may include a first rail hinged to a second rail; a third rail hinged to a fourth rail; the third and fourth rails being spaced apart from the first and second rails; a first plurality of natural bars suspended from the first and third rails; a second plurality of natural bars suspended from the second and fourth rails; a fifth rail hinged to a sixth rail; a seventh rail hinged to an eighth rail; the seventh and eighth rails being spaced apart from the fifth and sixth rails; a first plurality of accidental bars suspended from the fifth and seventh rails; a second plurality of accidental bars suspended from the sixth and eighth rails; wherein the rails are configurable in an unfolded configuration having a first length and a folded configuration having a second length that is less than the first length.

In some embodiments, a marimba may include first and second rails mounted to a first resonator panel in spaced relation to one another; a first plurality of natural bars suspended from the first and second rails; third and fourth rails mounted to the first resonator panel in spaced relation to one another; a first plurality of accidental bars suspended from the third and fourth rails; fifth and sixth rails mounted to a second resonator panel in spaced relation to one another; a second plurality of natural bars suspended from the fifth and sixth rails; seventh and eighth rails mounted to the second resonator panel in spaced relation to one another; a second plurality of accidental bars suspended from the seventh and eighth rails; the second resonator panel being hinged to the first resonator panel; wherein the resonator panels are configurable in an unfolded configuration having a first length and a folded configuration having a second length that is less than the first length.

In some embodiments, a marimba may include first and second rails mounted to a first resonator panel in spaced relation to one another; a first plurality of natural bars suspended from the first and second rails; third and fourth rails mounted to the first resonator panel in spaced relation to one another; a first plurality of accidental bars suspended from the third and fourth rails; fifth and sixth rails mounted to a second resonator panel in spaced relation to one another; a second plurality of natural bars suspended from the fifth and sixth rails; seventh and eighth rails mounted to the second resonator panel in spaced relation to one another; a second plurality of accidental bars suspended from the seventh and eighth rails; the first and fifth rails being hinged to each other; the second and sixth rails being hinged to each other; the third and seventh rails being hinged to each other; the fourth and eighth rails being hinged to each other; wherein the marimba is configurable in an unfolded configuration having a first length and a folded configuration having a second length that is less than the first length.

In some embodiments, a marimba may include first and second rails mounted to a first resonator panel in spaced relation to one another; a first plurality of natural bars suspended from the first and second rails; third and fourth rails mounted to a second resonator panel in spaced relation to one another; a first plurality of accidental bars suspended from the third and fourth rails; fifth and sixth rails mounted to a third resonator panel in spaced relation to one another; a second plurality of natural bars suspended from the fifth and sixth rails; seventh and eighth rails mounted to a fourth resonator panel in spaced relation to one another; a second plurality of accidental bars suspended from the seventh and eighth rails; the first and third resonator panels being hinged to each other; the second and fourth resonator panels being hinged to each other; wherein the marimba is configurable in an unfolded configuration having a first length and a folded configuration having a second length that is less than the first length.

In some embodiments, a marimba may include first and second rails mounted to a first resonator panel in spaced relation to one another; a first plurality of natural bars suspended from the first and second rails; third and fourth rails mounted to a second resonator panel in spaced relation to one another; a first plurality of accidental bars suspended from the third and fourth rails; fifth and sixth rails mounted to a third resonator panel in spaced relation to one another; a second plurality of natural bars suspended from the fifth and sixth rails; seventh and eighth rails mounted to a fourth resonator panel in spaced relation to one another; a second plurality of accidental bars suspended from the seventh and eighth rails; the first and fifth rails being hinged to each other; the second and sixth rails being hinged to each other; the third and seventh rails being hinged to each other; the fourth and eighth rails being hinged to each other; wherein the marimba is configurable in an unfolded configuration having a first length and a folded configuration having a second length that is less than the first length.

DETAILED DESCRIPTION

As used herein, the following terms should be understood to have the indicated meanings:

When an item is introduced by "a" or "an," it should be understood to mean one or more of that item.

"Comprises" means includes but is not limited to.

"Comprising" means including but not limited to.

"Having" means including but not limited to.

The term "marimba" means any musical instrument having tone bars that are struck to produce sounds, whether the tone bars are made of wood, metal, other material, or a combination thereof.

Figure 1:
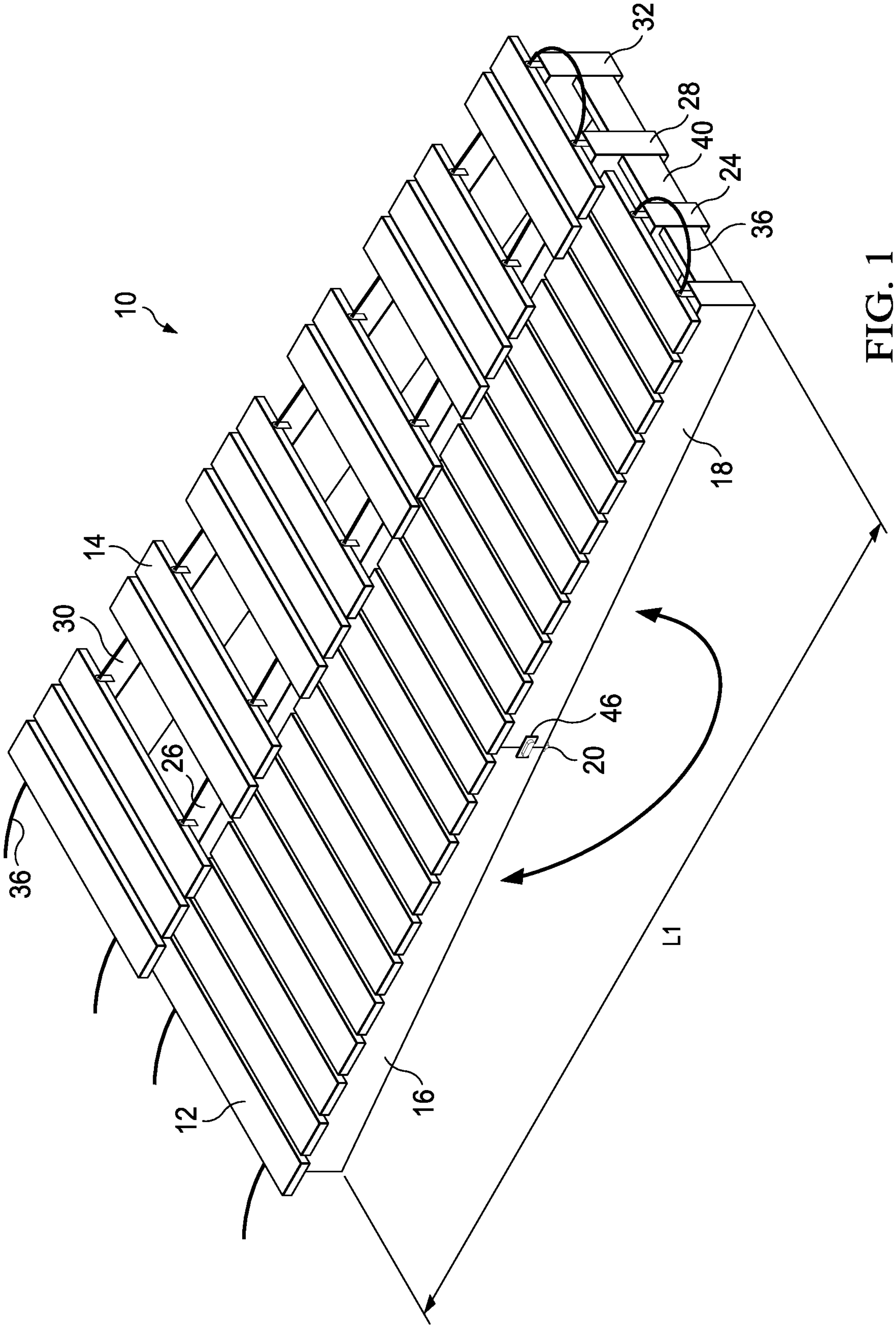
FIG. 1 is a perspective view of a marimba in an unfolded position.
Figure 2:
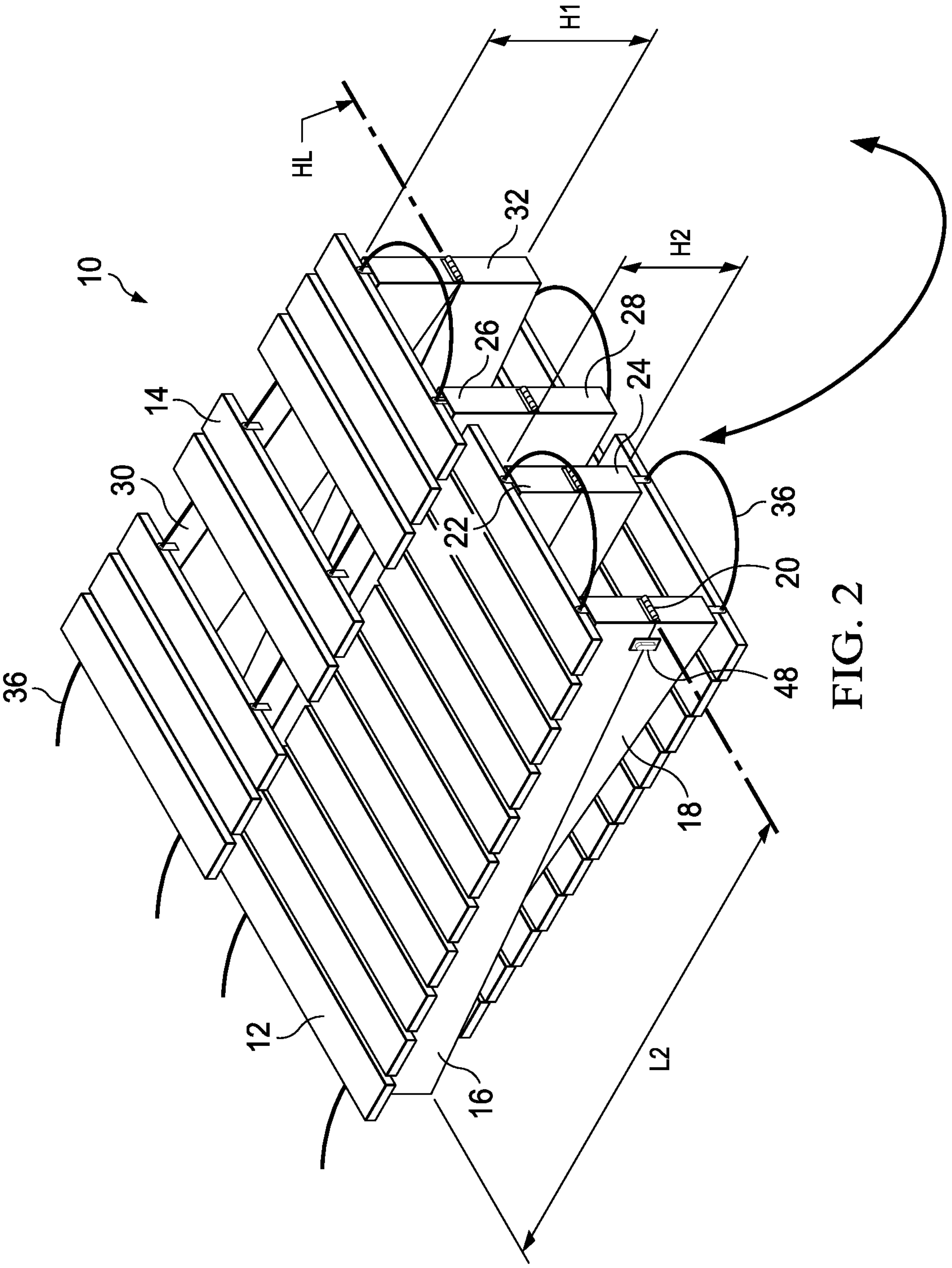
FIG. 2 is a perspective view of the marimba of FIG. 1 in a folded position.
Figure 3:
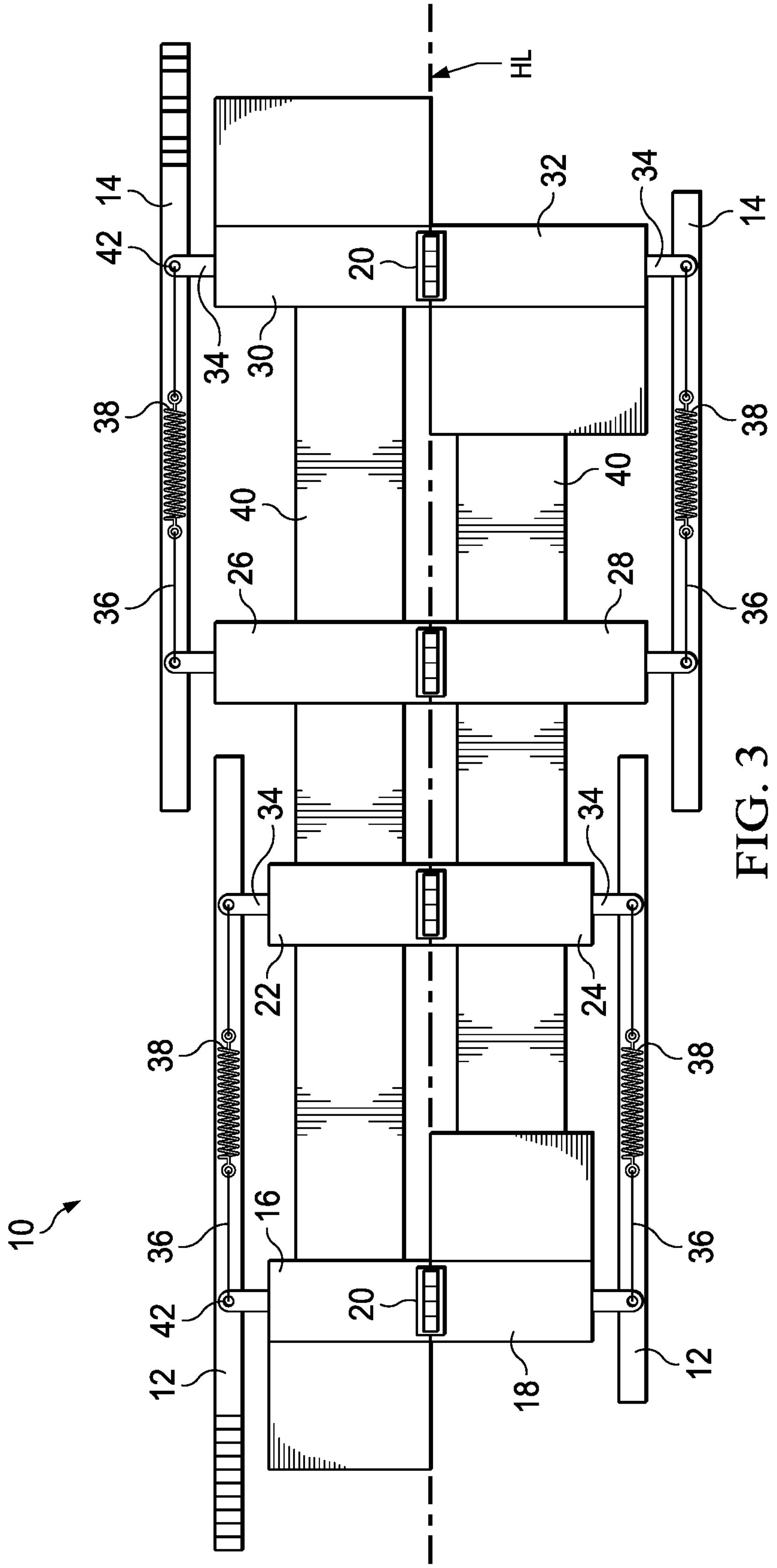
FIG. 3 is a side elevational view of the marimba of FIG. 1 in a folded position.

As shown in FIGS. 1-3, a folding marimba 10 may include a plurality of natural tone bars 12 (generally referred to herein as natural bars) and a plurality of accidental tone bars 14 (generally referred to herein as accidental bars). In some embodiments, the accidental bars 14 may partially overlap the natural bars 12. The natural bars 12 may be mounted to rails 16, 18, 22, 24 using standoffs 34 and strings 36, which may be routed through holes 42 of the standoffs 34 and corresponding holes (not shown) that run through the natural bars 12. One or more springs 38 may be used to join the ends of each string 36 to provide sufficient tension in the string 36 so that the natural bars 12 may be suspended at a desired elevation (e.g., substantially level with holes 42, or other suitable elevation). Similarly, the accidental bars 14 may be mounted to rails 26, 28, 30, 32 using standoffs 34 and strings 36, which may be routed through holes 42 of the standoffs 34 and corresponding holes (not shown) that run through the accidental bars 14. As with the natural bars 12, one or more springs 38 may be used to join the ends of each string 36 that traverses through the accidental bars 14 to provide sufficient tension in the string 36 so that the accidental bars 14 may be suspended at a desired elevation.

Although strings 36 are shown in a slack and untied condition in FIGS. 1 and 2 for the sake of illustration and clarity, persons of ordinary skill in the art will understand that the ends of each of the strings 36 may be connected and tensioned via springs 38 in an assembled condition as shown in FIG. 3. In some embodiments, a first string 36 may be routed through a first plurality of natural bars 12 (e.g., the natural bars 12 suspended from rails 16 and 22), a second string 36 may be routed through a second plurality of natural bars 12 (e.g., the natural bars 12 suspended from rails 18 and 24), a third string 36 may be routed through a first plurality of accidental bars 14 (e.g., the accidental bars 14 suspended from rails 26 and 30), and a fourth string 36 may be routed through a second plurality of accidental bars 14 (e.g., the accidental bars 14 suspended from rails 28 and 32). Of course, any number of groupings of tone bars may be used. In general, a group of tone bars suspended with a given string would not cross the hinge line HL described below for simplicity and ease of folding, although in some embodiments one or more groups of tone bars suspended with a given string may cross the hinge line HL if, for example, the string and/or its associated spring(s) have sufficient stretchability to permit folding as described herein.

To allow marimba 10 to be folded into a smaller size for transport or storage, one or more hinges 20 may be provided. For example, in some embodiments, rails 16 and 18 may be joined by a first hinge 20, rails 22 and 24 may be joined by a second hinge 20, rails 26 and 28 may be joined by a third hinge 20, and rails 30 and 32 may be joined by a fourth hinge 20. Each of the hinges 20 may be configured for rotation about the same hinge line HL. Alternatively, in some embodiments, each of the rails may be attached to a single hinge that spans substantially the entire width of the rails of marimba 10. In some embodiments, the tone bars 12, 14 may be substantially parallel to hinge line HL. As shown in FIG. 1, marimba 10 may have a length L1 in its unfolded condition, and marimba 10 may have a length L2 in its folded condition as shown in FIG. 2. As illustrated, the rails of each set of rails connected by a hinge 20 (e.g., rails 16 and 18, rails 22 and 24, rails 26 and 28, rails 30 and 32) may be substantially the same length, such that length L2 is about half of length L1. Alternatively, in some embodiments, the rails connected by a hinge 20 may have different lengths. As illustrated in FIG. 2, in some embodiments, to help facilitate an overlapping arrangement of the accidental bars 14 and natural bars 12, the rails 26, 28, 30, 32 associated with the accidental bars 14 may have a height H1 that is greater than the height H2 of the rails 16, 18, 22, 24 associated with the natural bars 12. For example, in some embodiments, height H1 may be about 9.0 inches and height H2 may be about 6.0 inches. Of course, any suitable heights may be used.

As shown in FIG. 3, in some embodiments, the outer ends of the rails of marimba 10 may be connected by one or more end members 40 for strength and stability. In some embodiments, the end members 40 may be connected to all four rails at a respective end (e.g., rails 16, 22, 26, 30 or rails 18, 24, 28, 32). In other embodiments, one end member 40 may be respectively connected to each pair of rails associated with the natural bars 12 (e.g., rails 16 and 22, and rails 18 and 24), and another end member 40 may be respectively connected to each pair of rails associated with the accidental bars 14 (e.g., rails 26 and 30, and rails 28 and 32). Of course, in addition to or in lieu of end members 40 at the ends of the rails, other stiffeners may be provided in each pair of rails at other intermediate locations along the length of the rails. In some embodiments, one or more latches 48 may be provided on the rails or other structure of marimba 10 to releasably fasten the marimba in a folded condition as shown in FIG. 2, and one or more latches 46 may be provided on the rails or other structure of marimba 10 to releasably fasten the marimba in an unfolded condition as shown in FIG. 1.

Figure 4:
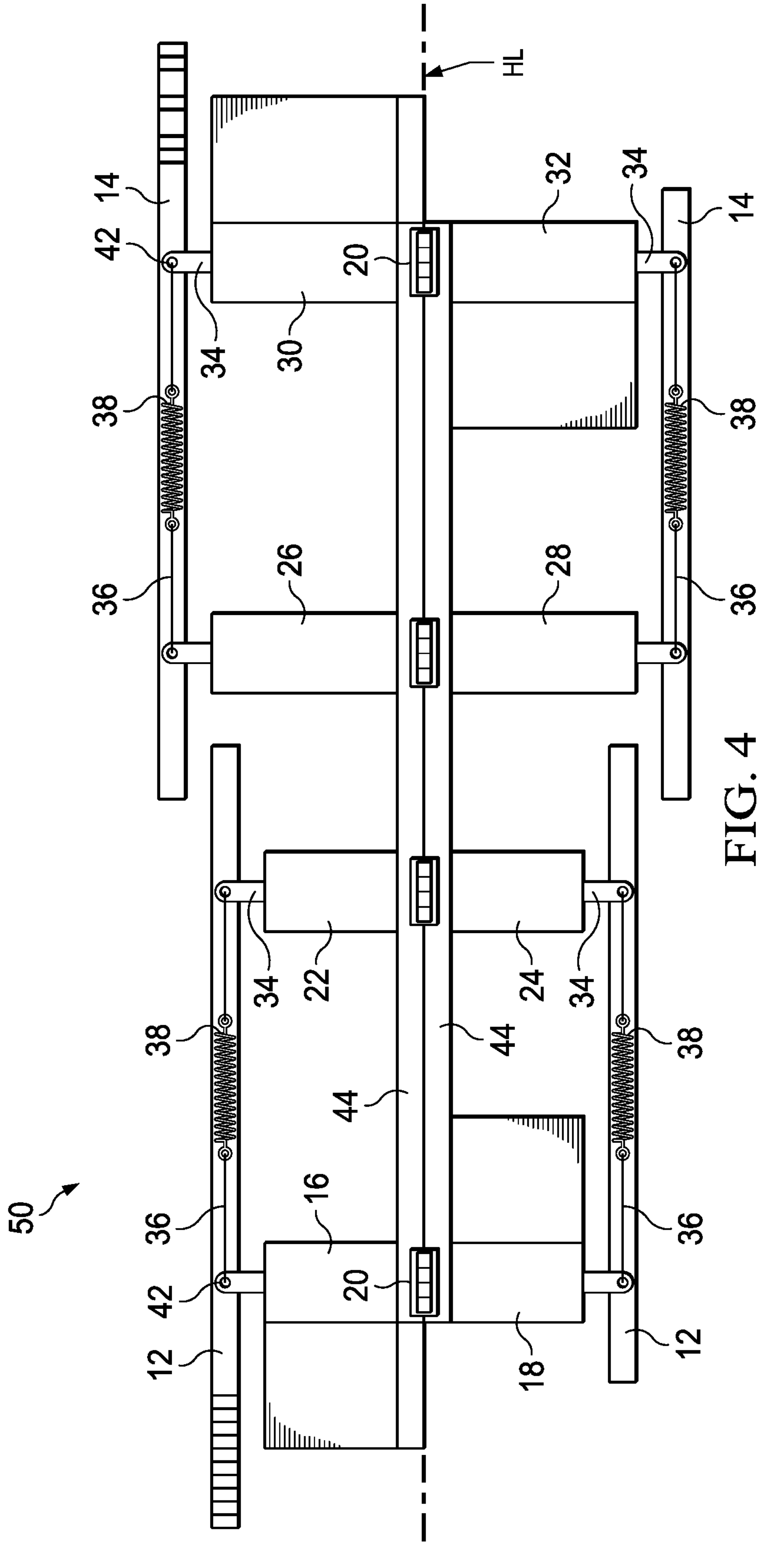
FIG. 4 is a side elevational view of another embodiment of a marimba in a folded position.

Referring to FIG. 4, another embodiment of a marimba 50 is shown. Marimba 50 is similar to marimba 10 described above except that rails 16, 22, 26, and 30 are mounted to a first resonator panel 44, and rails 18, 24, 28, and 32 are mounted to a second resonator panel 44. Each respective set of rails (e.g., rails 16 and 18, rails 22 and 24, rails 26 and 28, rails 30 and 32) may be connected by a hinge 20 in a manner similar to marimba 10 described above, or alternatively or additionally, the resonator panels 44 may be hingedly attached to each other and configured to rotate about hinge line HL. In some embodiments, the resonator panels 44 may be substantially flush with each other when the marimba 50 is in a folded condition as shown in FIG. 4. Marimba 50 may or may not also have one or more end members 40 or intermediate stiffeners connecting the rails as described above for marimba 10.

Figure 5:
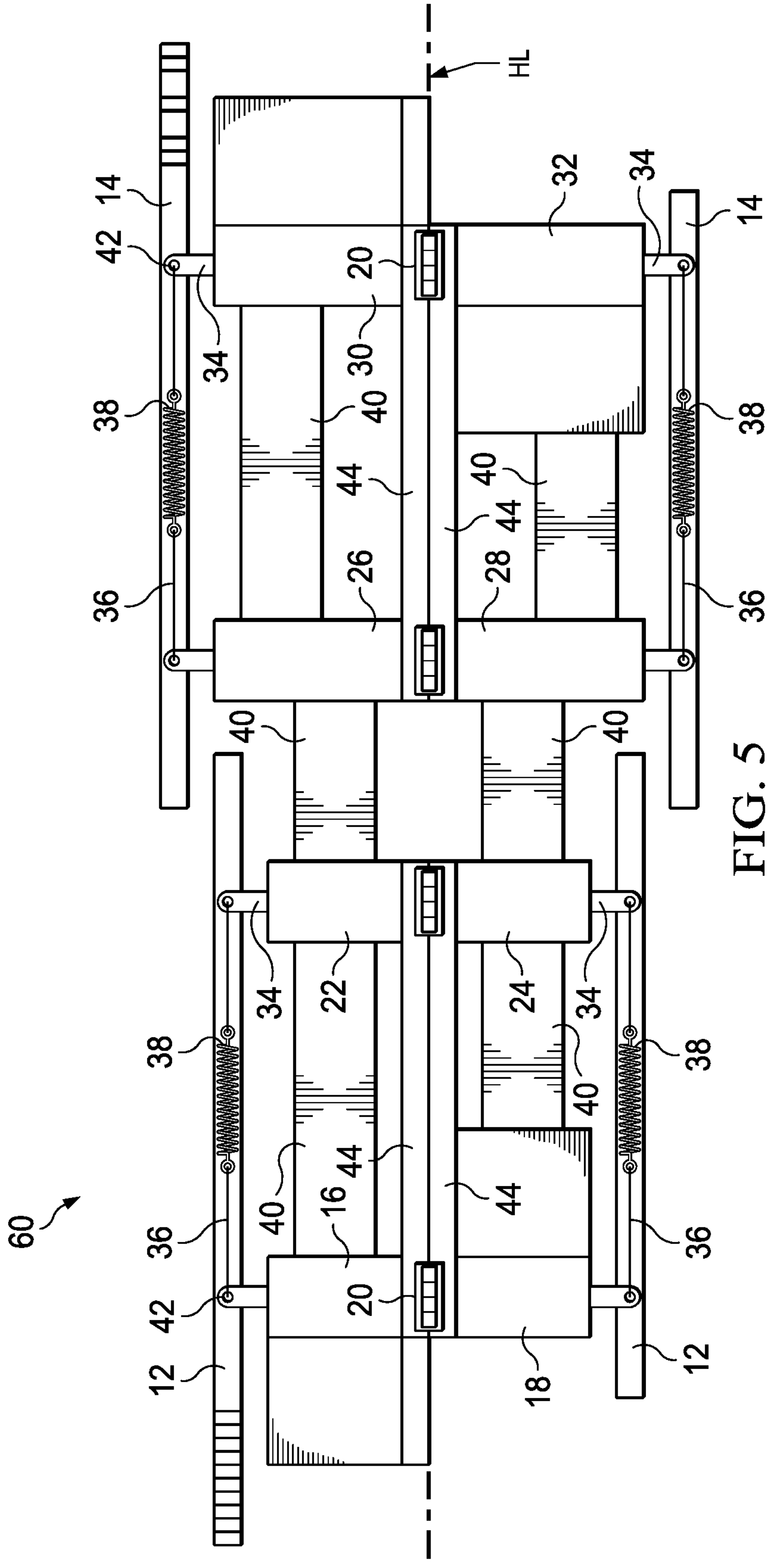
FIG. 5 is a side elevational view of still another embodiment of a marimba in a folded position.

As shown in FIG. 5, another alternative embodiment of a marimba 60 may be similar to marimba 50 described above except that marimba 60 may have four resonator panels 44 rather than two. In this embodiment, rails 16 and 22 are mounted to a first resonator panel 44, rails 18 and 24 are mounted to a second resonator panel 44, rails 26 and 30 are mounted to a third resonator panel 44, and rails 28 and 32 are mounted to a fourth resonator panel 44. Each respective set of rails (e.g., rails 16 and 18, rails 22 and 24, rails 26 and 28, rails 30 and 32) may be connected by a hinge 20 in a manner similar to marimba 10 described above, or alternatively or additionally, the resonator panels 44 may be hingedly attached to each other and configured to rotate about hinge line HL as shown. In some embodiments, the resonator panels 44 associated with the natural bars 12 and the accidental bars 14, respectively, may be substantially flush with each other when the marimba 60 is in a folded condition as shown in FIG. 5. Marimba 60 may or may not also have one or more end members 40 or intermediate stiffeners connecting the rails as described above for marimba 10.

Persons of ordinary skill in the art will appreciate that a marimba 10, 50, or 60 as described herein may be placed in an unfolded configuration for playing (e.g., on a table or instrument stand) and in a folded configuration (e.g., in a bag or case) for transport or storage. As such, a marimba as described herein may be easily, quickly, and manually adjusted to reduce its size for transport and storage and expanded to full size for playing. Because these instruments may be quite long (e.g., several feet long) in an unfolded condition and thus not suitable for carrying by a player, the ability to reduce the length by half is tremendously advantageous and makes it possible for a player (e.g., even a student player) to carry the instrument in a compact, folded condition. This is particularly helpful for younger, smaller students. For example, rather being relegated to practice on a shorter marimba that does not have a full range of tone bars, a student can readily transport and use a folding full-size marimba as described herein.

Although the foregoing specific details describe certain embodiments of this invention, persons of ordinary skill in the art will recognize that various changes may be made in the details of this invention without departing from the spirit and scope of the invention as defined in the appended claims and other claims that may be drawn to this invention and considering the doctrine of equivalents. Among other things, any feature described for one embodiment may be used in any other embodiment, and any feature described herein may be used independently or in combination with other features. Also, unless the context indicates otherwise, it should be understood that when a component is described herein as being mounted or connected to another component, such mounting or connection may be direct with no intermediate components or indirect with one or more intermediate components. Therefore, it should be understood that this invention is not to be limited to the specific details shown and described herein.

What is claimed is:

1. A marimba comprising:

a first set of spaced apart rails;

a first set of tone bars suspended from the first set of spaced apart rails by a first string;

a second set of spaced apart rails;

a second set of tone bars suspended from the second set of spaced apart rails by a second string;

a third set of spaced apart rails;

a third set of tone bars suspended from the third set of spaced apart rails by a third string;

a fourth set of spaced apart rails; and a fourth set of tone bars suspended from the fourth set of spaced apart rails by a fourth string;

wherein the first and second sets of spaced apart rails and the third and fourth sets of spaced apart rails are respectively configured for hinged rotation about a hinge line such that the marimba is configurable in an unfolded configuration having a first length and a folded configuration having a second length that is less than the first length.

2. The marimba of claim 1 wherein the tone bars are substantially parallel to the hinge line.

3. The marimba of claim 1 wherein the first and second sets of tone bars are natural bars and wherein the third and fourth sets of tone bars are accidental bars.

4. The marimba of claim 3 wherein the first and second sets of spaced apart rails have a first height and wherein the third and fourth sets of spaced apart rails have a second height that is greater than the first height.

5. The marimba of claim 4 wherein the accidental bars partially overlap the respective natural bars in the unfolded configuration.

6. The marimba of claim 1 wherein:

the first set of spaced apart rails is mounted to a first resonator panel;

the second set of spaced apart rails is mounted to a second resonator panel;

the third set of spaced apart rails is mounted to a third resonator panel; and the fourth set of spaced apart rails is mounted to a fourth resonator panel.

7. The marimba of claim 6 wherein the first and second resonator panels and the third and fourth resonator panels, respectively, are substantially flush with each other in the folded configuration.

8. The marimba of claim 1 wherein:

the first and third sets of spaced apart rails are mounted to a first resonator panel; and the second and fourth sets of spaced apart rails are mounted to a second resonator panel.

9. The marimba of claim 8 wherein the first and second resonator panels are substantially flush with each other in the folded configuration.

10. The marimba of claim 1 wherein the first and second sets of spaced apart rails are connected by a first pair of hinges and wherein the third and fourth sets of spaced apart rails are connected by a second pair of hinges.

11. The marimba of claim 1 further comprising a plurality of end members respectively connecting the first, second, third, and fourth sets of spaced apart rails.

12. The marimba of claim 1 further comprising a plurality of stiffeners at intermediate locations along each set of spaced apart rails.

13. The marimba of claim 1 further comprising a spring respectively connecting ends of each string.

14. The marimba of claim 1 further comprising:

a first end member spanning the first and third sets of spaced apart rails; and a second end member spanning the second and fourth sets of spaced apart rails.

15. The marimba of claim 1 wherein the second length is about half of the first length.

* * * * *